United States Patent Office 3,474,673
Patented Oct. 28, 1969

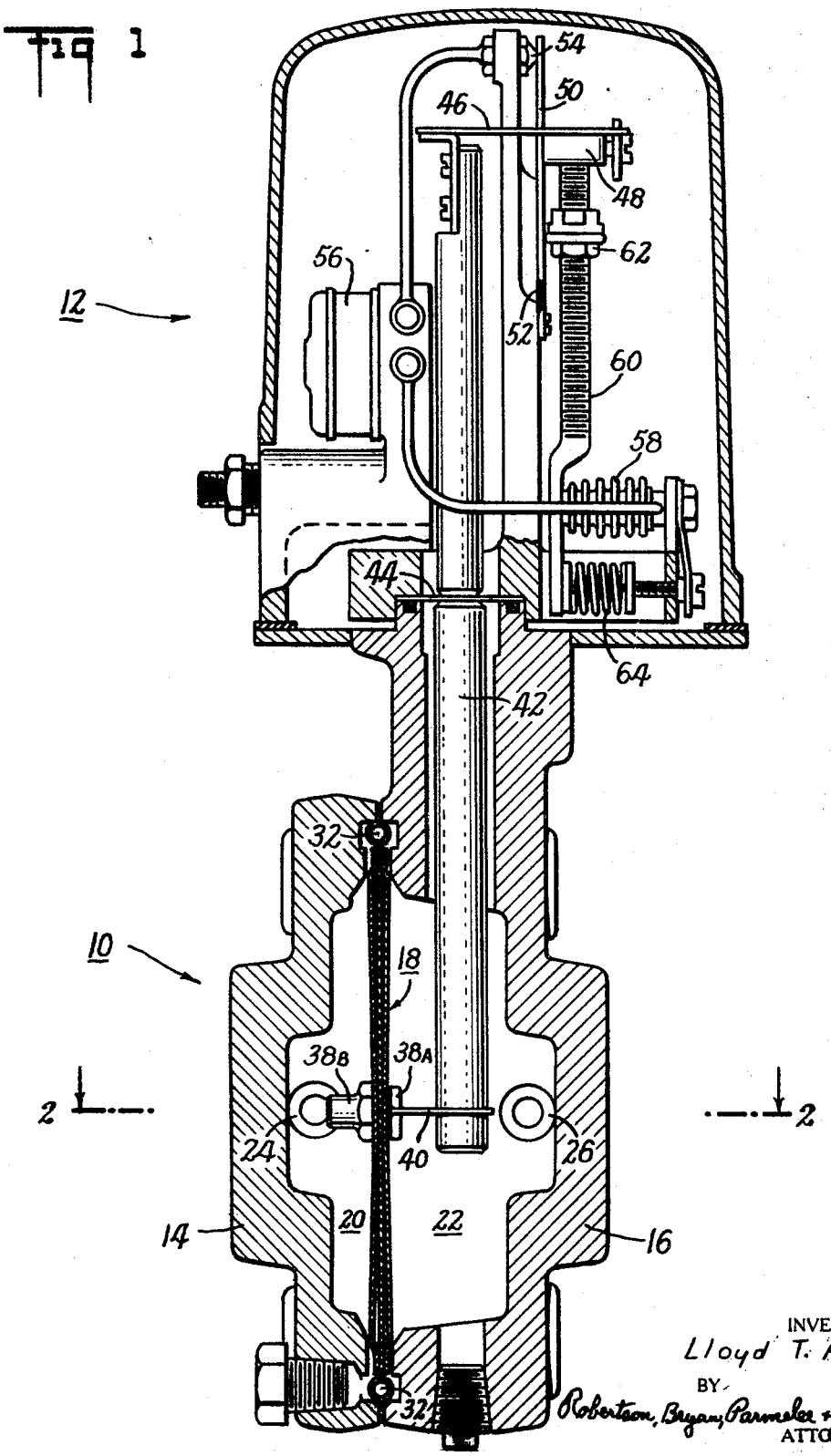

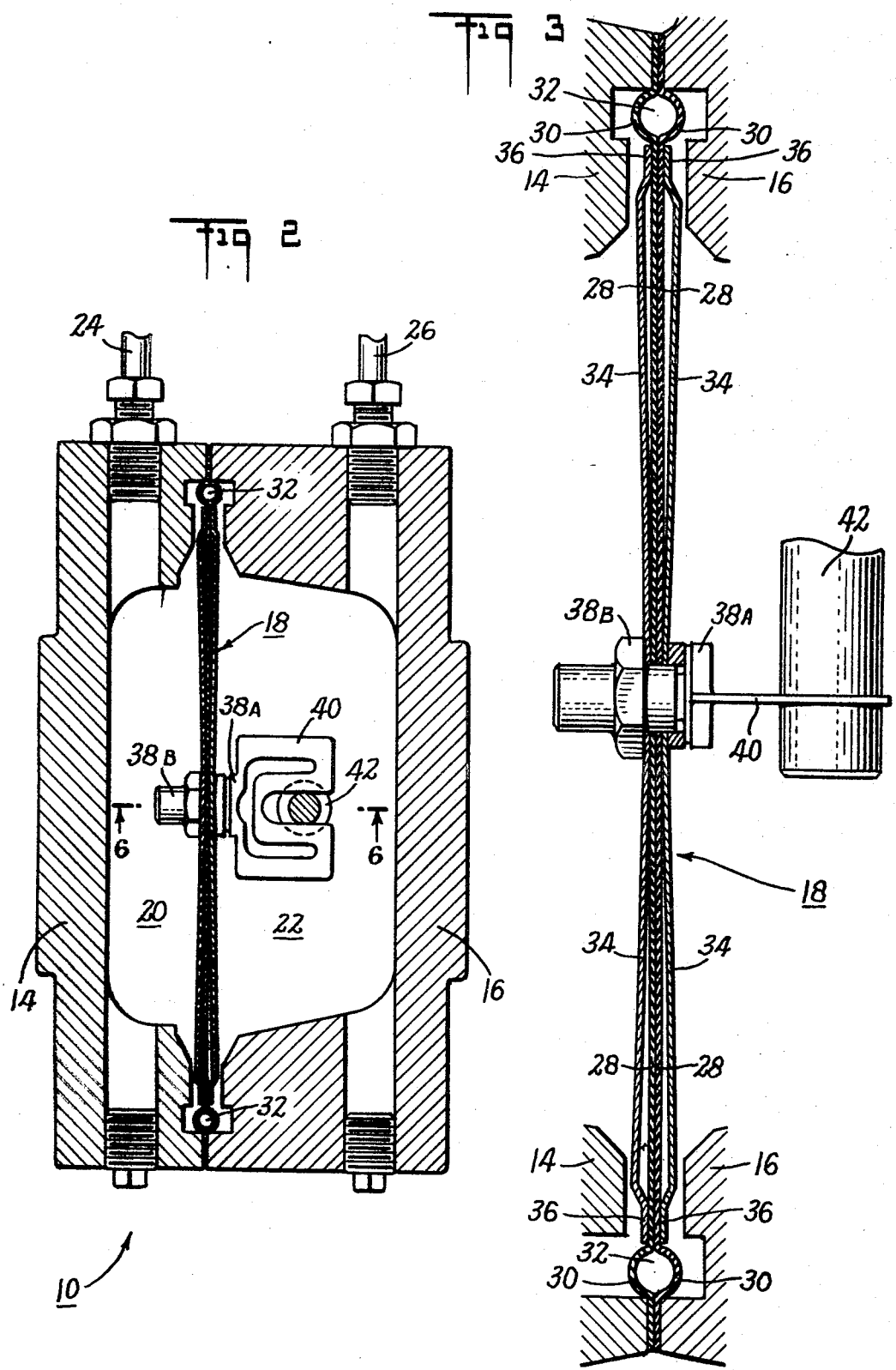

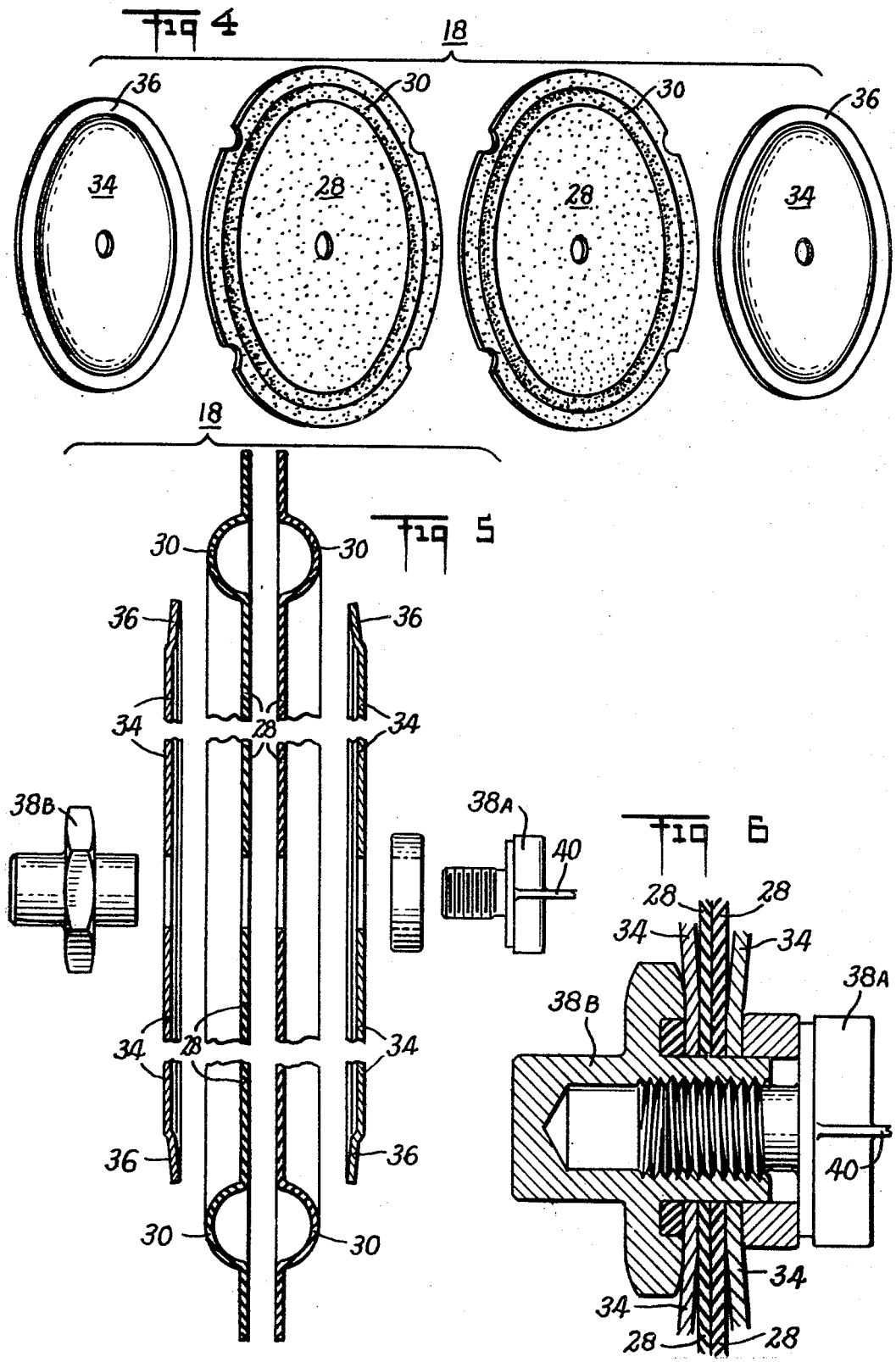

3,474,673
DIFFERENTIAL-PRESSURE-RESPONSIVE APPARATUS
Lloyd T. Akeley, Charlestown, N.H., assignor to The Foxboro Company, Foxboro, Mass., a corporation
Filed Jan. 26, 1968, Ser. No. 700,934
Int. Cl. G01l 7/08
U.S. Cl. 73—407                                            10 Claims

ABSTRACT OF THE DISCLOSURE

A differential-pressure-responsive apparatus of the "force-balance" type is disclosed wherein a force transmitting bar extends into a sealed housing and is mounted for pivoting movement responsive to differential pressure on opposed surfaces of a diaphragm within the sealed housing. A balancing system is provided externally of the sealed housing to exert on the external portion of the force-bar a force that continuously balances the force exerted on the opposite end of the force-bar by the differential-pressure-responsive diaphragm. The diaphragm is constructed so as to be essentialy slack throughout the operating range, and has an annular fluid-filled cavity around its periphery to provide a smooth and linear transition when the differential pressure on the diaphragm reverses direction and passes through a zero value.

---

This invention relates to the measurement of differential pressures and more particularly to force-balance apparatus for measuring differential pressures that vary through zero, i.e., wherein the differential pressure changes direction. This apparatus converts the applied differential pressure into a corresponding signal, e.g., a pneumatic pressure, that may be used to operate conventional indicating, recording and/or controlling devices associated with an industrial process.

While differential pressure measuring devices have a variety of uses, they are extensively used for the measurement of fluid flow and hence the device of the present invention will be illustratively described herein as employed for making such a fluid flow measurement. For this service the measuring device typically is made responsive to the differential pressure between two points spaced along a flowing stream, e.g., upstream and downstream of an orifice inserted in a flow pipe, and the measured differential pressure provides an indication of the flow rate through the pipe. A flow measuring system of that type is shown in Bowditch Patent No. 2,806,480.

There is a special problem in measuring very low differential pressures such as are encountered, for example, in the flow of gas in an exhaust flue where the pressure differentials may be within the range of 0.5 inch of water. The problem is made particularly acute because there is a tendency at times for the flow of gas in the flue to reverse direction so that the pressure differential reverses direction, i.e., passes through a zero value.

Conventional meters used for making such flue gas measurements (sometimes called "draft" meters) employ a highly resilient rubber diaphragm having a single convolution intended to provide slack characteristics of effectively no tension in the diaphragm. However, as the pressure differential reverses direction, the reading of such a conventional meter frequently will not be consistently linear or uniform. It has been found that apparently this is because in reversing its position the diaphragm tends to become quite distorted physically, as by folding back on itself to assume abnormal configurations and thereby alter in an erratic fashion the force applied by the diaphragm to the force-sensing mechanism.

It is, accordingly, an object of the present invention to provide an improved differential-pressure-responsive device which is especially adapted to be used in making low-level fluid flow measurements. It is another object of the present invention to provide a differential-pressure-responsive device of the force-balance type which provides a more consistent proportional relationship between differential pressure and output signal when the differential pressure passes through a zero value. Other objects of the invention will be in part apparent and in part pointed out hereinafter.

The objects and advantages of the present invention may be best understood and appreciated by reference to the accompanying drawings which illustrate a differential pressure transmitter incorporating a preferred embodiment of the present invention and wherein:

FIGURE 1 is a vertical central section through the transmitter;

FIGURE 2 is a horizontal section taken along line 2—2 of FIGURE 1 showing details of the sealed casing;

FIGURE 3 is an enlarged view of the differential-pressure-responsive diaphragm;

FIGURES 4 and 5 are exploded views of the diaphragm parts before assembly; and

FIGURE 6 is a detail section of the diaphragm clamp.

Referring to the drawings and more particularly to FIGURE 1, the differential pressure transmitter comprises in general a lower casing 10, which contains a differential-pressure-responsive diaphragm to be described, and an upper casing 12 that houses certain external parts of the apparatus including a pneumatic rebalance system. As shown in FIGURE 1 of the above-mentioned Bowditch Patent No. 2,806,480, such a differential-pressure-responsive transmitter can conveniently be mounted directly on a flow pipe.

The casing 10 is formed in two parts 14 and 16 which for convenience will be referred to respectively as the cover and body. A resilient diaphragm 18 is secured between the cover and body and divides the interior of the casing into two separate chambers 20 and 22. These chambers are supplied with fluid pressure by respective pipe connections 24 and 26 which may, for example, lead to respective longitudinally displaced openings in a conduit such as a gas flue, so as to develop a pressure differential between the two chambers 20 and 22 proportional to the gas flow rate squared. It will be evident that the direction of the differential pressure applied to the diaphragm will be determined by the direction of flow through the conduit, and for the purposes of this disclosure it will be assumed that this direction of flow will reverse from time to time.

Referring also to FIGURES 3–5, the diaphragm 18 advantageously comprises two circular membranes 28 of rubber that abut each other in a central portion of the diaphragm. The peripheral portions of the membranes are clamped tightly together by planar faces of the cover 14 and body 16. Immediately adjacent these peripheral portions, membranes 28 are formed with opposed concave convolutions 30 which define a small annular cavity 32, preferably having a generally circular cross-section. The diameter of this cavity is substantially smaller than the diaphragm diameter, preferably less than one-tenth.

The annular cavity 32 may be filled with an incompressible fluid, e.g., oil, to assure an essentially fixed diaphragm configuration when the differential pressure passes through a zero value and reverses. It has been found that such stability of configuration results in a smooth transition providing more consistently accurate measurements during reversal of the differential pressure. Other types of fluid filling, including a gas, may be used, in the annular cavity 32, depending on the particular application, e.g. the magnitude of the static pressure expected within the chambers 20 and 22.

If a gas filling is used, it may be pressurized initially to a level above atmospheric, but in some applications the initial pressure could be atmospheric, or even below atmospheric. Basically, the interior fluid should be such as to maintain at least the general shape of the diaphragm convolutions 30, i.e. without important deformation such as inward folding, as the differential pressure passes through zero and builds up in the opposite direction. By pressurizing the gas to a level approximating the expected static pressure, or less, the rubber material forming the annular cavity will be maintained essentially without internal tension when the instrument is in operation.

Opposing metal spring disks 34 are provided on each side of the diaphragm 18 and each has an outer flange element 36 which is formed prior to installation at an angle with respect to the plane of the disk, as best shown in FIGURE 5. When the disks are fastened tightly together at their centers with the diaphragm membranes 28 between them, these flange elements bend into position parallel to the plane of the diaphragm (FIGURES 1-3). This tends to distribute the compressive load of the flange elements over a relatively broad area of the diaphragm membranes, and yet provides localized highly-stressed compression at the outer edges of the disks so as to assure tight seals in the region immediately adjacent the annular cavity 32.

The disks 34 are fastened together at their centers by a sealing clamp comprising a short bolt 38A on one side and a nut 38B on the other. The disks thus form an essentially rigid and dimensionally stable central portion which presents to pressure chambers 20 and 22 corresponding diaphragm working surfaces of constant effective area throughout the operating range of the instrument. This rigid central portion is circular in configuration, and its outer edge is located immediately adjacent the inner circumference of the convolutions 30. The outer circumference of these convolutions is located immediately adjacent the clamping surfaces of the casing 10, so that convolutions 30 represent the sole resilient diaphragm material exposed directly to the differential pressure within the casing.

The head of bolt 38A carries one end of a short horizontal flexure link 40. The other end of this link is formed with a U-shaped section the arms of which are secured to the lower end of an elongate vertical force-bar 42 of generally conventional construction. This force-bar is supported for slight pivotal movement by a thin flat metal diaphragm 44 which is circular and coaxial with the force-bar. Diaphragm 44 is secured to the force-bar and to the casing 10 in such a manner as to seal the interior chamber 22 from outside atmosphere.

At the upper end of the force-bar 42 is a pneumatic force-balancing mechanism the detailed arrangement of which is similar to that disclosed in the above-mentioned U.S. Patent 2,806,480. In brief, this force-bar is secured at its top to a yoke plate 46 extending horizontally to a block 48 which is supported for slight horizontal movement by a pair of vertical flexure strips (not shown herein, in order to simplify the drawings). Block 48 engages a vertical flapper 50 arranged to flex about a reduced-thickness portion 52 serving as a pivot axis for the flapper and biasing the flapper to the left.

As block 48 moves horizontally with force-bar 42, the upper end of the flapper moves correspondingly with respect to a conventional pneumatic control nozzle 54 secured to the instrument frame. This nozzle is supplied with air under pressure through a connection including a flow restrictor, so that in known manner the position of the flapper determines the nozzle back pressure. The nozzle back pressure is transmitted to the usual pneumatic relay 56 which produces a proportional relay output pressure of relatively high power capacity.

The output pressure from relay 56 is connected to a small feedback bellows 58 which presses with corresponding force against the lower portion of a vertical range-adjusting lever 60 pivoted about an adjusting nut 62. This feedback force is opposed by a bias force applied to the lever by a zero-setting tension spring 64. The resultant composite force developed at the upper end of lever 60 is applied to the support block 48 to oppose and balance the force transmitted thereto by the force-bar 42.

As is well known in this art, the feedback pressure in bellows 58 is automatically adjusted, by the action of the flapper-nozzle 50, 54, so as to maintain all of the forces in balance, with essentially no motion of the mechanical parts. Consequently, changes in the feedback pressure (which also constitutes the transmitter output signal) will accurately represent changes in the differential pressure applied to diaphragm 18 without any significant motion of the diaphragm.

An important advantageous feature of the present invention is the use in such a force-balance instrument of the special differential-pressure-responsive diaphragm 18 having characteristics which provide smooth linear transition through a zero differential pressure value. The resilience of the diaphragm material provides the slack characteristic of effectively zero radial tension in the operating span encompassing differential pressures of quite small magnitude. The constructional arrangement including the annular fluid-filled cavity near the periphery of the diaphragm assures linearity and uniformity during the critical transitional phase when the pressure differential reverses, passes through a zero value, and increases in the opposite direction.

This important result derives in part from the fact that the diaphragm is effectively symmetrical, presenting identical characteristics to differential pressures of either direction. Also of considerable significance is the fact that the fluid fill within the annular cavity tends to resist deformation from the pressures within casing 10, and thereby prevents folding or comparable effective distortion of either of the convolutions 30 when the differential pressure reverses direction.

It is recognized that diaphragms of many different types and configurations have been proposed in the past for a variety of purposes, and it is desired to stress that there is no claim made herein broadly to have invented a basically new diaphragm construction as such. Rather the present invention comprises a novel combination of elements forming a new differential-pressure measuring instrument which serves in a unique manner to measure accurately very small differential pressures which vary through zero and within a small range on both sides of zero. This novel combination of elements includes a slack diaphragm which is held essentially motionless by force feedback (thus maintaining the relaxed condition throughout the operating range) and which particularly is arranged to present to both pressure chambers a stable configuration throughout a span encompassing the transition where the differential pressure reverses direction.

The foregoing description is illustrative only and numerous changes can be made in the specific embodiment described without departing from the spirit of the invention as defined in the appended claims. For example, although a pnuematic force rebalancing mechanism has been disclosed, an electrically-actuated rebalancing means could equally well be employed, as in prior art differential pressure instruments, and thereby provide an electrical rather than a pneumatic measurement signal. Still other more specific changes can be made to the apparatus to meet the requirements of particular applications.

I claim:

1. In a differential-pressure-responsive instrument for producing a measurement signal representing a low-level differential pressure which at times reverses direction, said instrument being of the type comprising a sealed casing with a generally planar diaphragm secured therein to divide the interior of said casing into two pressure chambers adapted to receive respective fluids under pressure; a force-bar mounted for motion in response to movement of the diaphragm along its axis, and force rebalancing means coupled to said force-bar to sense changes in the position of said force-bar resulting from changes in the differential pressure across said diaphragm and to alter correspondingly a rebalance force applied to said force-bar; that improvement in said instrument wherein said diaphragm comprises a form-retaining central portion surrounded by a peripheral portion of flexible resilient material which in neutral position is substantially free from radial tension so as to provide operating characteristics of a slack diaphragm, said resilient material having opposed sections forming a hollow annular cavity extending entirely around said central portion; and a fluid in said cavity to resist in a symmetrical fashion deformation of the resilient material with differential pressures of either direction, the outer perimeter of said peripheral portion being adjacent the interior wall of said sealed casing, the force rebalancing means including means for adjusting the rebalance force to a value limiting the displacement of said force-bar and diaphragm to within a range wherein both of said resilient sections retain said slack diaphragm characteristics.

2. Apparatus as claimed in claim 1, wherein said central portion is substantially rigid, said resilient material being formed as a pair of adjacent planar membranes with oppositely-facing convolutions near the peripheries thereof to define said annular cavity.

3. Apparatus as claimed in claim 2, wherein said rigid central portion comprises a pair of metal disks on opposite sides of said resilient membranes; and means urging said disks towards one another under substantial force so as to seal said resilient membranes together in the region immediately adjacent said annular cavity.

4. Apparatus as claimed in claim 3, wherein said disks are formed with peripheral flange elements which extend inwardly towards said membranes to provide a high compression seal therebetween along the outer edge of said disks.

5. Apparatus as claimed in claim 4, including clamp means extending through the center of said membranes to hold said disks tightly together.

6. A force-balance, essentially motion-free differential-pressure transmitter adapted to produce an output signal corresponding consistently to differential pressures of relatively low magnitude and reversible in direction, comprising:

a sealed casing to which two fluids under pressure are to be conducted for the purpose of measuring the differential pressures therebetween;

a pivotally-mounted force-bar having one end within said casing and its other end outside said casing;

a differential-pressure-responsive diaphragm mounted in said casing between said two fluids under pressure and connected to said one end of said force-bar to apply thereto a force proportional to the applied differential pressure and tending to rotate said force-bar about its pivot axis;

means connected to said other end of said force-bar to exert a rebalance force thereon opposing the force exerted on said one end by said differential-pressure-responsive diaphragm;

sensing means responsive to slight pivotal movements of said force-bar and arranged to alter correspondingly said rebalance force in such a manner as effectively to eliminate any motion of said differential-pressure-diaphragm with changes in said differential pressure;

said diaphragm comprising a pair of symmetrically matching generally planar membranes positioned side-by-side in parallel disposition and sealed together around the peripheries thereof;

said diaphragm membranes further having opposed convoluted portions near the peripheries thereof defining an annular cavity between said membranes;

said annular cavity containing a fill fluid with internal pressure characteristics adapted to resist significant inward deformation of either of said convoluted portions when the differential pressure reverses direction, said convoluted portions with internal fluid pressure support providing symmetrical diaphragm responses to equal differential pressure changes on either side of zero and consistently smooth uniform responses to differential pressure changes passing through zero.

7. The differential-pressure transmitter of claim 6 wherein said opposed convoluted portions of said planar membranes form facing concavities defining said annular cavity.

8. The differential-pressure transmitter of claim 6 wherein said differential-pressure-responsive diaphragm includes opposed resilient disk members on each side of said diaphragm to retain said membranes in abutting relation.

9. The differential-pressure transmitter of claim 8 wherein said opposed resilient disk members are substantially circular spring plates having a peripheral flange initially bent at an angle with respect to the plane of said disks, whereby upon application of a compressive force at the center of said disks, said disks are pressed flat against said diaphragm membranes and said outer peripheral flange flattens out against said diaphragm membrane to provide a compressive seal.

10. The differential-pressure-responsive transmitter of claim 9 including means at the center of said diaphragm and said opposed resilient disks to provide a compressive sealing force to retain said resilient members against said diaphragm membranes, and means connecting the center of said diaphragm membranes to said force bar.

References Cited

UNITED STATES PATENTS 3,411,363   11/1968   Danvic et al. _____ 73—407

DONALD O. WOODIEL, Primary Examiner